Patented June 15, 1954

2,681,371

UNITED STATES PATENT OFFICE 2,681,371

PRODUCTION OF ORTHO SUBSTITUTED PHENOLS, PARTICULARLY ORTHO SUBSTITUTED HYDROQUINONES

Alexander Gaydasch, Brookfield, and William K. T. Gleim, Orland Park, Ill., assignors to Universal Oil Products Company, Chicago, Ill., a corporation of Delaware No Drawing. Application December 14, 1950, Serial No. 200,874

22 Claims. (Cl. 260—624)

This application is a continuation-in-part of our copending application Serial Number 79,906 filed March 5, 1949, now abandoned.

This invention relates to the synthesis of ortho substituted phenols and particularly to the production of ortho allylic substituted dihydric phenols.

An object of this invention is to produce an ortho substituted phenol.

Another object of this invention is to produce an ortho allylic substituted phenol.

A further object of this invention is to produce an ortho allylic substituted mono hydric phenol.

A still further object of this invention is to produce an ortho allylic substituted dihydric phenol.

An additional object of this invention is to produce 2-methallyl hydroquinone.

One embodiment of this invention relates to a process for producing an ortho substituted phenol which comprises reacting a phenol having a replaceable nuclear hydrogen atom in ortho position to hydroxyl with a halide selected from the group consisting of a tertiary alkyl halide, an allylic halide and a benzyl halide in the presence of a caustic solution and an alkaline reducing agent.

Another embodiment of this invention relates to a process for producing an ortho substituted phenol which comprises reacting a phenol having a replaceable nuclear hydrogen atom in ortho position to hydroxyl with a halide selected from the group consisting of a tertiary alkyl halide, an allylic halide and a benzyl halide in the presence of a caustic soda solution and an alkaline reducing agent.

A further embodiment of this invention relates to a process for producing an ortho substituted phenol which comprises reacting a phenol having a replaceable nuclear hydrogen atom in ortho position to hydroxyl with a halide selected from the group consisting of a tertiary alkyl halide, an allylic halide and a benzyl halide in the presence of a caustic soda solution and an aqueous solution of sodium hydrosulfite.

A still further embodiment of this invention relates to a process for producing 2-methallyl hydroquinone which comprises reacting hydroquinone with beta-methallyl chloride in the presence of caustic soda solution and sodium hydrosulfite.

We have found that hydroquinone and other phenols react with allylic halides and also tertiary alkyl halides and benzyl halides under strict exclusion of air (or oxygen) in the presence of sodium hydroxide and sodium hydrosulfite to give an unexpected result, namely, the production of ortho allylic hydroquinone rather than the expected allylic mono ether of hydroquinone which is generally produced in the presence of caustic soda solution containing no sodium hydrosulfite or other alkaline reducing agent. The 2-methallyl hydroquinone which is so produced by reacting methallyl chloride with hydroquinone in the presence of sodium hydroxide and sodium hydrosulfite may be converted readily into 2,2 - dimethyl - 5 - hydroxycoumaran by mild treatment with a mineral acid or other acid-acting compound which promotes formation of a ring involving the allylic substituent and the phenolic hydroxyl group in ortho position to the allylic substituent. These coumaran type compounds which may also be referred to as hydroxy coumarans are useful as antioxidants in organic substances which tend to deteriorate because of oxidation, polymerization or other undesired reactions. These compounds are also useful as biological control factors, medical agents, and for other purposes.

The phenolic compounds which are used as starting materials in this process include both mono hydric and polyhydric phenols and thus comprise phenols, mono alkyl phenols, polyalkyl phenols having at least 1 replaceable hydrogen atom in ortho position to the hydroxyl group, dihydric phenols such as hydroquinone, catechol and resorcinol in which a replaceable nuclear hydrogen atom is in ortho position to a hydroxyl group.

The organic halides which are reacted with a phenol as herein set forth include tertiary alkyl halides, allylic halides and benzyl halides. The particular halide to be employed will depend upon the final production desired. Thus in order to produce 2-methallyl hydroquinone, methallyl chloride or another methallyl halide is reacted with hydroquinone. When other ortho substituted phenols are desired, the other halides hereinbefore set forth and hydroquinone, catechol and resorcinol will be used depending upon the desired reaction product. Of the halides, the bromides and chlorides are preferred because of their lower cost and ready availability. However, it is understood that the iodides and fluorides may be used but not necessarily with equivalent results.

The use of caustic as a catalyst for effecting the reaction of a phenol including a dihydric phenol such as hydroquinone with an organic halide results in the production of excessive amount of undesired monoether and diether rather than the production of the desired ortho substituted phenol such as 2-methallyl hydroquinone. The production of these undesired ethers not only creates an additional problem of separating the desired ortho substituted phenols but also reduces the yield of this desired reaction product. In addition, undesired polymerization of the allylic halide occurs to an excessive amount, especially in the presence of air, and this polymerization reduces further the yield of the desired ortho allylic substituted phenol. To overcome these objections the use of alkali carbonate as a catalyst has been suggested but it has now been found that these objections can now be avoided by using a caustic solution as catalyst provided an alkaline reducing agent is also present.

It is an essential feature of the present invention that the catalyst in this step of the process is caustic, including sodium hydroxide, potassium hydroxide, etc. Alkali carbonate, such as sodium or potassium carbonate, cannot be used because it has been found that the reaction will not proceed in the presence of potassium carbonate and an alkaline reducing agent such as sodium hydrosulfite.

Any suitable alkaline reducing agent may be used in accordance with the present invention and thus may comprise the hydrosulfites, sulfides, bisulfides, thiosulfates, thionates, etc. of alkaline reagents including the alkali metals, the alkaline earth metals, ammonium, etc. A particularly satisfactory alkaline reducing agent for use in the present invention comprise sodium hydrosulfite.

As an additional control to minimize undesired polymerization reactions in this process when utilizing allylic halides, the reaction of a phenol particularly a dihydric phenol such as hydroquinone and an allylic halide is effected preferably in the presence of an inert atmosphere and particularly in the presence of a nitrogen atmosphere. At least one molecular proportion of organic halide will be employed per molecular proportion of dihydric phenol also referred to as dihydroxybenzene and in general it is preferred to use an excess of organic halide in order to insure complete reaction of the phenol. Preferred operation involves use of from about 1 to about 2 molecular proportions of organic halide per molecular proportion of phenol. The excess halide may be recovered unchanged for further use in the process. In general, the amount of caustic solution will be from about 0.5 to about 1 mol of caustic soda or its equivalent per molecular proportion of phenolic group present in the phenol undergoing treatment. Thus from about 1 to about 2 mols of caustic soda solution would be employed per molecular proportion of a dihydroxybenzene such as hydroquinone. It is preferred, however, to use from about 1.0 to about 1.5 mols of caustic soda solution per mol of dihydroxy benzene being treated.

The alkaline reducing agent is generally used in an amount less than the amount of caustic employed. Thus the alkaline reducing agent is generally from about 0.001 to about 0.1 mol per mol of caustic solution so utilized. This ratio of alkaline reducing agent to caustic soda solution is critical in that less than 0.001 mol of alkaline reducing agent per mol of caustic is ineffective while more than about 0.1 mol of alkaline reducing agent per mol of caustic inhibits the formation of ortho substituted phenols and results in a low yield of this desired product. The preferred proportion of alkaline reducing agent to caustic solution appears to be from about 0.005 to about 0.01 mol of alkaline reducing agent per mol of caustic present in the reaction mixture.

Any suitable method of reacting the phenolic starting material and organic halide may be used.

Thus when reacting a dihydroxybenzene such as hydroquinone and an organic halide, a particularly suitable method, which is relatively simple and produces very satisfactory results, is to heat and reflux the dihydroxybenzene and halide in the presence of the aqueous caustic solution and alkaline reducing agent while stirring vigorously. The temperature of heating and refluxing will, of course, depend upon the particular halide employed and generally will be at the boiling point temperature of the halide under the particular pressure employed. The time of refluxing should be sufficient to complete the reaction and will vary with the particular halide and with the particular type of refluxing apparatus employed.

After the reaction has been completed to the desired extent, the products upon cooling will separate into a water layer and a product layer. The water layer will usually be clear and colorless and may be drawn off and discarded or reused in the process as desired. The product layer will comprise ortho substituted dihydroxybenzene and unreacted halide. Any suitable means of purifying the product layer from entrained water and separating the unreacted halide from the ortho substituted dihydroxybenzene may be used. A suitable method for small scale operations is to dissolve the product layer in a suitable organic solvent such as ethyl ether followed by water washing, drying and evaporation to remove the halide which may be recovered for further use in the process.

Ortho substituted phenols formed in this process may be used for any desired purpose. Thus 2-methallyl hydroquinone, that is, 2-($\beta$-methallyl) hydroquinone, prepared in the manner hereinbefore set forth is converted into a coumaran by treatment at a temperature of from about 0° to about 100° C. with a mineral acid as hydrochloric, sulfuric, or phosphoric acid or other acid-acting catalyst which effects cyclization involving the unsaturated side chain and a hydroxyl group. The resultant compound thus is a polycyclic ring compound containing a hydroxy aromatic ring joined to a heterocyclic oxygen ring. For example, in the preparation of 2,2 - dimethyl - 5 - hydroxycoumaran, hydroquinone is reacted with methallyl chloride to form 2-methallyl hydroquinone which is then cyclicized to form 2,2-dimethyl-5-hydroxycoumaran. Similarly a 2-(gamma, gamma-methallyl) hydroquinone on treatment with an acid undergoes cyclization to form a chroman as the essential product, but a 2-(gamma-methallyl)-hydroquinone which has a replaceable hydrogen atom on each of the doubly bonded carbon atoms may be cyclicized by an acid to form mainly coumaran mixed with a smaller amount of a chroman.

As another feature of the present invention the cyclization of a 2-allylic hydroquinone is effected in the presence of stannous chloride along with a suitable acid such as formic acid, hydrochloric acid, hydrobromic acid, alone or admixed with glacial acetic acid, etc. It has been found that a purer final product is obtained when this step of the process is effected in the presence of stannous chloride. The amount of stannous chloride to be used will be within the range of from about 0.05 to about 0.5 mol of stannous chloride per mol of acid catalyst. The cyclization is effected readily by refluxing at the boiling point of the acid which, in the case of formic acid, is about 100° C. The cyclization may be effected in the presence of dilute acid of concentrations within the range of from about 80% to about 95%. It is readily apparent that the commercial formic acid of about 90% concentration is considerably less expensive and more readily available than the pure acid. After the reaction has been completed, the formic acid may be removed by distillation, and the hydroxy coumaran or hydroxychroman may be purified in any suitable manner, such as by vacuum distillation, water washing, extraction with ether and/or recrystallization from alcohol, etc.

For the preparation of inhibitors for use in preventing oxidative deterioration of unstable compounds, it has been found that the addition of an alkyl group in a position ortho to the hydroxy radical of a coumaran or chroman greatly improves the potency thereof. In accordance with the invention, the 5-hydroxy coumarans or the 6-hydroxy chromans may be reacted with an olefin, alcohol or other olefin producing material in the presence of a suitable catalyst such as phosphoric acid, sulfuric acid, etc. to form the desired alkylated product. The alkylation is readily accomplished with phosphoric acid at low temperatures of the order of 70–90° C.

The following example is introduced to illustrate further the novelty and utility of the present invention but with no intention of unduly limiting the generally broad scope of the invention.

EXAMPLE

Methallyl hydroquinone was obtained by reacting hydroquinone with methallyl chloride in the presence of sodium hydroxide and small amounts of sodium hydrosulfite, $Na_2S_2O_4$. Several runs were made in each of which 110 grams of hydroquinone was placed in a rotatable steel autoclave together with the amounts of methallyl chloride, sodium hydroxide and sodium hydrosulfite shown in the following table. In charging the autoclave precaution was taken to displace the air therefrom by means of nitrogen before introducing the hydroquinone and other reactants. The autoclave and contents were then heated at a temperature of 70° C. for a time of two hours after which the products were removed and investigated.

Table

| Run number | 1 | 2 | 3 | 4 | 5 |
| --- | --- | --- | --- | --- | --- |
| Mols sodium hydroxide: | | | | | |
| Added | 1.2 | 1.2 | 1.05 | 1.05 | |
| Consumed | 1.1 | 1.17 | 1.02 | 0.98 | |
| Methallyl chloride, mols: | | | | | |
| Added | 1.5 | 2 | 1.5 | 1.5 | |
| Consumed | 1.1 | 1.17 | 1.02 | 0.98 | |
| Sodium hydrosulfite added, mols | 0.1 | 0.01 | 0.005 | 0.005+0.1 mol $Na_2SO_3$ | 1.00 |
| Hydroquinone: | | | | | |
| Recovered, g | 15 | 6 | 11 | | 95 |
| Mols consumed | 0.87 | 0.95 | 0.90 | | 0.14 |
| Mono-methallyl derivatives of hydroquinone: | | | | | |
| weight, grams | 150 | 158 | 125 | 153 | |
| Mols hydroquinone used for it | 0.90 | 0.96 | 0.76 | 0.93 | |
| Di-methallyl derivatives of hydroquinone, Extractable with 10% NaOH from pentane: | | | | | |
| weight, grams | | 12 | 17 | 21 | |
| mols of hydroquinone used for it | | 0.06 | 0.08 | 0.1 | |
| Caustic insoluble material: | | | | | |
| weight, grams | 15 | 12 | 7 | 3 | |
| mols of hydroquinone used | 0.07 | 0.06 | 0.03 | 0.1 | |
| 2,2-dimethyl-5-hydroxy-coumaran crystallized, grams | 4 | 26 | 23 | | |

From the table it is noted that production of monomethallyl hydroquinone did not occur when equal molecular proportions of sodium hydrosulfite and sodium hydroxide were present in the reaction mixture. The preferred proportion of sodium hydrosulfite to caustic soda solution was from about 0.005 to about 0.01 mole hydrosulfite per mole of sodium hydroxide. The 2-methallyl hydroquinone so produced was converted into 2,2-dimethyl-5-hydroxy-coumaran by treatment with a mineral acid such as hydrochloric acid or sulfuric acid. The 2,2-dimethyl-5-hydroxy-coumaran could then be alkylated with isobutylene in the presence of sulfuric acid, hydrogen fluoride, phosphoric acid or other acid-acting catalysts to produce 6-tertiary-butyl-2,2-dimethyl-5-hydroxy-coumaran which is an effective inhibitor for preventing deterioration of hydrocarbon oils and animal and vegetable oils by oxidation reaction.

We claim as our invention:

1. A process for producing an ortho substituted phenol which comprises reacting a phenol having a replaceable nuclear hydrogen atom in ortho position to hydroxyl with a halide selected from the group consisting of a tertiary alkyl halide, an allylic halide and a benzyl halide in the presence of a caustic solution and an alkaline reducing agent selected from the group consisting of the alkali metal, alkaline earth metal and ammonium hydrosulfites, sulfides, bisulfides, thiosulfates and thionates.

2. A process for producing an ortho substituted phenol which comprises reacting a phenol having a replaceable nuclear hydrogen atom in ortho position to hydroxyl with a halide selected from the group consisting of a tertiary alkyl halide, an allylic halide and a benzyl halide in the presence of a caustic soda solution and an alkaline reducing agent selected from the group consisting of the alkali metal, alkaline earth metal and ammonium hydrosulfites, sulfides, bisulfides, thiosulfates and thionates.

3. A process which relates to a method for producing an ortho substituted phenol which comprises reacting a phenol having a replaceable nuclear hydrogen atom in ortho position to hydroxyl with a halide selected from the group consisting of a tertiary alkyl halide, an allylic halide and a benzyl halide in the presence of a caustic solution and an aqueous solution of sodium hydrosulfite.

4. A process for producing an ortho substituted monohydric phenol which comprises reacting a monohydric phenol having a replaceable nuclear hydrogen atom in ortho position to the hydroxyl group with a halide selected from the group consisting of a tertiary alkyl halide, an allylic halide and a benzyl halide in the presence of a caustic solution and an alkaline reducing agent selected from the group consisting of the alkali metal, alkaline earth metal and ammonium hydrosulfites, sulfides, bisulfides, thiosulfates and thionates.

5. A process for producing an ortho substituted dihydric phenol which comprises reacting a dihydric phenol having a replaceable nuclear hydrogen atom in ortho position to the hydroxyl group with a halide selected from the group consisting of a tertiary alkyl halide, an allylic halide and a benzyl halide in the presence of a caustic solution and an alkaline reducing agent selected from the group consisting of the alkali metal, alkaline earth metal and ammonium hydrosulfites, sulfides, bisulfides, thiosulfates and thionates.

6. A process for producing an ortho substituted dihydric phenol which comprises reacting a dihydric phenol having a replaceable nuclear hydrogen atom in ortho position to the hydroxyl group with a halide selected from the group consisting of a tertiary alkyl halide, an allylic halide and a benzyl halide in the presence of a caustic soda solution and of from about 0.001 to about 0.1 mole of sodium hydrosulfite per mole of said caustic soda solution.

7. A process for producing an ortho substituted dihydric phenol which comprises reacting a dihydric phenol having a replaceable nuclear hydrogen atom in ortho position to a hydroxyl group with a halide selected from the group consisting of a tertiary alkyl halide, an allylic halide and a benzyl halide in the presence of from about 1 to about 2 moles of caustic soda solution per mole of dihydric phenol and from about 0.001 to about 0.1 mole of sodium hydrosulfite per mole of said caustic soda solution.

8. A process for preparing a 2-allylic hydroquinone which comprises reacting hydroquinone with an allylic halide in the presence of a caustic solution and an alkaline reducing agent selected from the group consisting of the alkali metal, alkaline earth metal and ammonium hydrosulfites, sulfides, bisulfides, thiosulfates and thionates.

9. A process for preparing 2-methallyl hydroquinone which comprises reacting hydroquinone with beta-methallyl chloride in the presence of caustic solution and an alkaline reducing agent selected from the group consisting of the alkali metal, alkaline earth metal and ammonium hydrosulfites, sulfides, bisulfides, thiosulfates and thionates.

10. A process for producing 2-methallyl hydroquinone which comprises reacting hydroquinone with beta-methallyl chloride in the presence of caustic solution and sodium hydrosulfite.

11. A process for producing 2-methallyl hydroquinone which comprises reacting 1 molecular proportion of hydroquinone with from about 1 to about 2 molecular proportions of beta-methallyl chloride in the presence of from about 1 to about 2 molecular proportions of caustic soda solution and from about 0.002 to about 0.2 molecular proportions of sodium hydrosulfite to form 2-methallyl hydroquinone and recovering said 2-methallyl hydroquinone.

12. In a process for reacting a phenol with a halide selected from the group consisting of a tertiary alkyl halide, an allylic halide and a benzyl halide in the presence of a caustic solution, the improvement which comprises adding an alkaline reducing agent to the reaction mixture and effecting the reaction in the presence of both the caustic solution and the reducing agent, said reducing agent being selected from the group consisting of the alkali metal, alkaline earth metal and ammonium hydrosulfites, sulfides, bisulfides, thiosulfates and thionates.

13. The process of claim 1 further characterized in that the caustic is present in an amount of from about 1 to about 2 moles per mole of said phenol and said reducing agent is present in an amount of from about 0.001 to about 0.1 mole per mole of said caustic.

14. The process of claim 1 further characterized in that the caustic is sodium hydroxide and said reducing agent is sodium hydrosulfite.

15. The process of claim 1 further characterized in that said phenol is hydroquinone.

16. The process of claim 1 further characterized in that said reducing agent comprises a hydrosulfite.

17. The process of claim 1 further characterized in that said reducing agent comprises a sulfide.

18. The process of claim 1 further characterized in that said reducing agent comprises a bisulfide.

19. A process for producing an ortho substituted phenol which comprises reacting a phenol having a replaceable nuclear hydrogen atom in ortho position to the hydroxyl with an allylic halide in the presence of a caustic solution and an alkaline reducing agent selected from the group consisting of the alkali metal, alkaline earth metal and ammonium hydrosulfites, sulfides, bisulfides, thiosulfates and thionates.

20. The process of claim 19 further characterized in that said reducing agent comprises a hydrosulfite.

21. The process of claim 19 further characterized in that said reducing agent comprises a sulfide.

22. The process of claim 19 further characterized in that said reducing agent comprises a bisulfide.

References Cited in the file of this patent

UNITED STATES PATENTS

| Number | Name | Date |
|---|---|---|
| 2,362,479 | Gibbs | Nov. 14, 1944 |
| 2,378,698 | Gibbs | June 19, 1945 |
| 2,459,835 | Monroe | Jan. 25, 1949 |

OTHER REFERENCES

Adams et al., "Org. Reactions," vol. II, page 33 (1944).